United States Patent
Kadotani et al.

(10) Patent No.: US 11,354,619 B2
(45) Date of Patent: Jun. 7, 2022

(54) VEHICLE DISPATCH DEVICE

(71) Applicant: TOYOTA JIDOSHA KABUSHIKI KAISHA, Toyota (JP)

(72) Inventors: Naotoshi Kadotani, Sunto-gun (JP); Seiji Arakawa, Sunto-gun (JP); Junya Watanabe, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 231 days.

(21) Appl. No.: 16/202,443

(22) Filed: Nov. 28, 2018

(65) Prior Publication Data
US 2019/0180233 A1 Jun. 13, 2019

(30) Foreign Application Priority Data
Dec. 11, 2017 (JP) .............................. JP2017-236965

(51) Int. Cl.
*G06Q 10/08* (2012.01)
*G05D 1/02* (2020.01)

(52) U.S. Cl.
CPC ..... *G06Q 10/08345* (2013.01); *G05D 1/0212* (2013.01)

(58) Field of Classification Search
CPC .............. G06Q 10/08345; G05D 1/0212
See application file for complete search history.

(56) References Cited

U.S. PATENT DOCUMENTS

| 4,800,502 A * | 1/1989 | Stewart | G06Q 30/0284 |
| | | | 235/30 R |
| 9,256,852 B1 | 2/2016 | Myllymaki | |
| 2007/0273514 A1* | 11/2007 | Winand | G07C 9/28 |
| | | | 340/572.1 |
| 2012/0004936 A1* | 1/2012 | Hamblett | G06Q 10/02 |
| | | | 705/5 |

(Continued)

FOREIGN PATENT DOCUMENTS

WO   WO 2016/135650 A1 *   9/2016   ............. G06Q 50/30

OTHER PUBLICATIONS

Travel & Tourism News Middle East: TTN, "Sheer magic in Monaco," Syndicate Media Inc., Manama, Feb. 1, 2017.*

(Continued)

*Primary Examiner* — Nathan Erb
(74) *Attorney, Agent, or Firm* — Sughrue Mion, PLLC

(57) ABSTRACT

A vehicle dispatch device includes a position determination unit determining whether or not a destination and a delivery place match each other, a calculation unit calculates a delivery service fee to the delivery place, and a distance determination unit determining whether or not a boarding distance from a boarding position to the destination is equal to or longer than a reference boarding distance, wherein when the destination and the delivery place do not match each other and the boarding distance is not equal to or longer than the reference boarding distance, the calculation unit calculates a first delivery service fee, and when the destination and the delivery place do not match each other and (Continued)

the boarding distance is equal to or longer than the reference boarding distance, the calculation unit calculates a second delivery service fee, which is lower than the first delivery service fee.

3 Claims, 14 Drawing Sheets

(56) References Cited

U.S. PATENT DOCUMENTS

| | | | |
|---|---|---|---|
| 2014/0229258 A1* | 8/2014 | Seriani | G06Q 10/08345 705/14.23 |
| 2016/0012066 A1* | 1/2016 | Ning | H04N 21/4524 707/722 |

OTHER PUBLICATIONS

Kennedy, Frances, "Sticky runway and strikes add to travel chaos in Italy," The Independent, Final Edition, Independent Digital News & Media, London, UK, 16, Nov. 10, 1998.*

Biesada, Alexandra, "Truck Soup," Financial World, Financial World Partners, New York, 161.16: 22, Aug. 4, 1992.*

* cited by examiner

*Fig.5*

| VEHICLE IDENTIFICATION NUMBER | VEHICLE POSITION | TRAVEL PLAN | ... |
|---|---|---|---|
| REGISTERED VEHICLE 2A | LATITUDE : XX LONGITUDE : XX | TRAVEL PLAN A | ... |
| REGISTERED VEHICLE 2B | LATITUDE : XX LONGITUDE : XX | TRAVEL PLAN B | ... |
| REGISTERED VEHICLE 2C | LATITUDE : XX LONGITUDE : XX | TRAVEL PLAN C | ... |
| ... | ... | ... | ... |

Fig.6A  G1

- DESTINATION
  [     ]
- LUGGAGE DELIVERY?
  [YES]  [NO]
- LUGGAGE DELIVERY PLACE
  [     ]

Fig.6B  G2

LUGGAGE DELIVERY
DISCOUNT PLAN

FEE: SECOND DELIVERY
SERVICE FEE

· WILL YOU USE?

[YES]  [NO]

Fig.6C  G3

LUGGAGE DELIVERY PLAN

FEE: FIRST DELIVERY
SERVICE FEE

· WILL YOU USE?

[YES]  [NO]

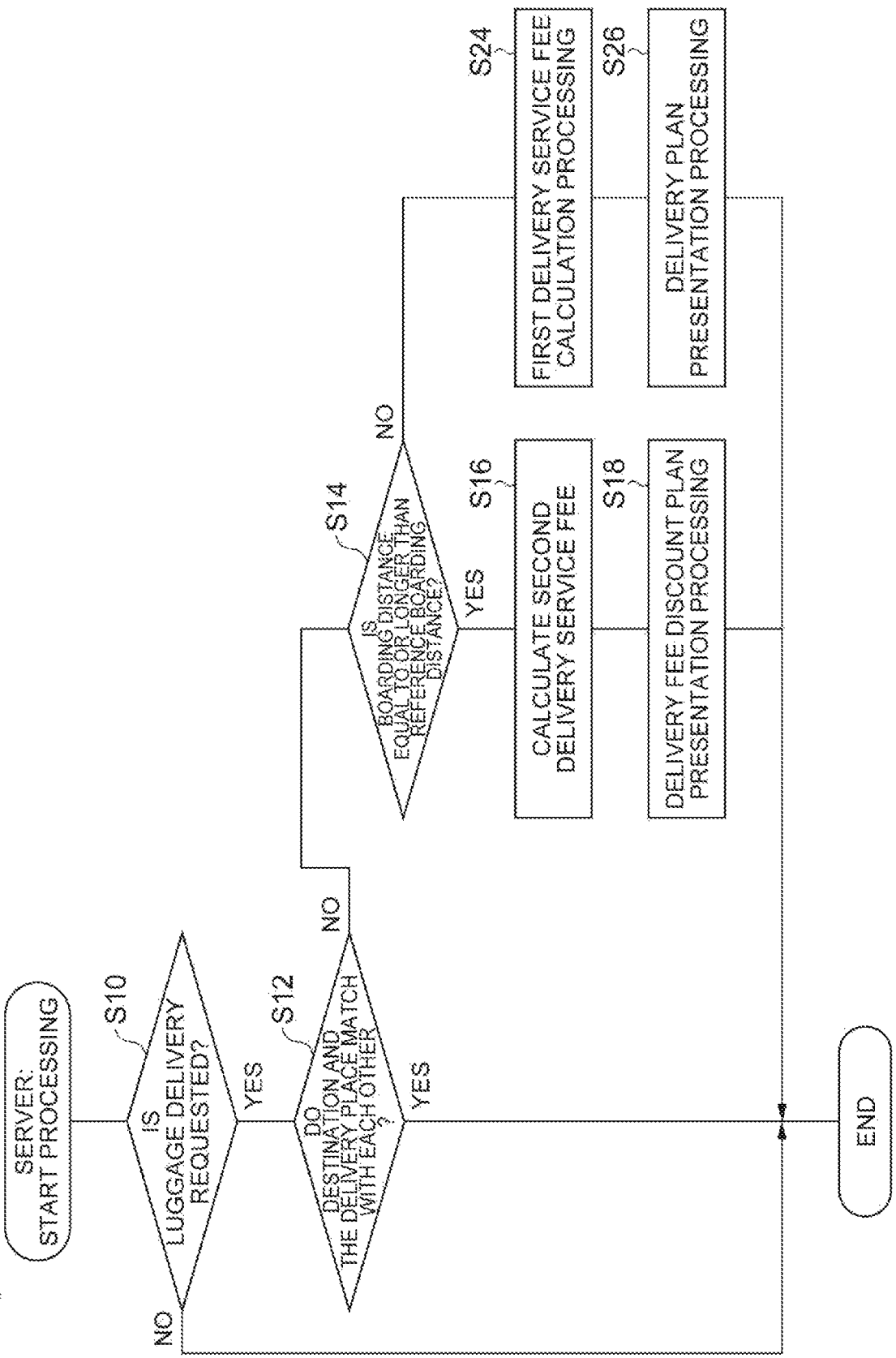

VEHICLE DISPATCH DEVICE

CROSS-REFERENCE TO RELATED APPLICATION

This application is based on Japanese Patent Application No. 2017-236965 filed with Japan Patent Office on Dec. 11, 2017, the entire contents of which are hereby incorporated by reference.

TECHNICAL FIELD

The present disclosure relates to a vehicle dispatch device.

BACKGROUND

U.S. Pat. No. 9,256,852 discloses a delivery service that uses an autonomous driving vehicle.

SUMMARY

Incidentally, a user of an autonomous driving vehicle having luggage may desire to deliver the luggage to a place different from user's destination. For example, in some cases, the user may desire to alight from the vehicle at a place where he wishes to visit before checking-in at a hotel, and may only deliver the luggage to the hotel. In order to respond to such needs, it is conceivable that the vehicle dispatch device causes the autonomous driving vehicle to move so as to transport the user to the destination, and then, deliver the luggage to the delivery place. However, since such a service requires a delivery service fee as well as a boarding fee, the user may be reluctant to use the service. In the present technical field, it is desired to promote the use of a combined service using an autonomous driving vehicle, which is the combination of the transportation and the delivery.

According to an aspect of the present disclosure, there is provided a vehicle dispatch device that is configured to dispatch an autonomous driving vehicle in response to a vehicle dispatch request from a user device. The vehicle dispatch device includes an acquisition unit configured to acquire a boarding position, a destination and a luggage delivery place from the user device, a position determination unit configured to determine whether or not the destination and the delivery place match each other, a calculation unit configured to calculate a delivery service fee to the delivery place, and a distance determination unit configured to determine whether or not a boarding distance from the boarding position to the destination is equal to or longer than a reference boarding distance. The calculation unit is configured to calculate a first delivery service fee as the delivery service fee when it is determined by the position determination unit that the destination and the delivery place do not match each other and when it is determined by the distance determination unit that the boarding distance is not equal to or longer than the reference boarding distance. The calculation unit is configured to calculate a second delivery service fee which is lower than the first delivery service fee as the delivery service fee when it is determined by the position determination unit that the destination and the delivery place do not match each other and when it is determined by the distance determination unit that the boarding distance is equal to or longer than the reference boarding distance.

In the vehicle dispatch device, when it is determined by the distance determination unit that the boarding distance is not equal to or longer than the reference boarding distance, the calculation unit calculates the first delivery service fee, and when it is determined by the distance determination unit that the boarding distance is equal to or longer than the reference boarding distance, the calculation unit calculates the second delivery service fee that is lower than the first delivery service fee. As described above, since the delivery service fee is calculated lower when the boarding distance is equal to or longer than the reference boarding distance, it is easy for the user to use not only the transportation service using the autonomous driving vehicle but also the delivery service using the autonomous driving vehicle. Accordingly, the vehicle dispatch device can promote the use of the combined service which is the combination of the transportation and the delivery.

According to another aspect of the present disclosure, there is provided a vehicle dispatch device that is configured to dispatch an autonomous driving vehicle in response to a vehicle dispatch request from a user device. The vehicle dispatch device includes an acquisition unit configured to acquire a boarding position, a destination and a luggage delivery place from the user device, a position determination unit configured to determine whether or not the destination and the delivery place match each other, a calculation unit configured to calculate a delivery service fee to the delivery place, and a delivery determination unit configured to determine whether or not a delivery distance from the destination to the delivery place is equal to or shorter than a reference delivery distance. The calculation unit is configured to calculate a first delivery service fee as the delivery service fee when it is determined by the position determination unit that the destination and the delivery place do not match each other and when it is determined by the delivery determination unit that the delivery distance is not equal to or shorter than the reference delivery distance. The calculation unit is configured to calculate a third delivery service fee which is lower than the first delivery service fee as the delivery service fee when it is determined by the position determination unit that the destination and the delivery place do not match each other and when it is determined by the delivery determination unit that the delivery distance is equal to or shorter than the reference delivery distance.

In the vehicle dispatch device, when it is determined by the delivery determination unit that the delivery distance is not equal to or shorter than the reference delivery distance, the calculation unit calculates the first delivery service fee, and when it is determined by the delivery determination unit that the delivery distance is equal to or shorter than the reference delivery distance, the calculation unit calculates the third delivery service fee which is lower than the first delivery service fee. As described above, since the delivery service fee is calculated lower when the delivery distance is equal to or shorter than the reference delivery distance, it is easy for the user to use not only the transportation service using the autonomous driving vehicle but also the delivery service using the autonomous driving vehicle. Accordingly, the vehicle dispatch device can promote the use of the combined service which is the combination of the transportation and the delivery.

According to various aspects of the present disclosure, a vehicle dispatch device that can promote the use of a combined service using an autonomous driving vehicle, which is the combination of the transportation and the delivery, is provided.

BRIEF DESCRIPTION OF THE DRAWINGS

FIG. 5 illustrates an example of data stored in a server.

FIGS. 6A, 6B, and 6C are screen examples of a user device displaying information relating to the combined service which is the combination of the transportation and the delivery.

FIG. 7 is a flowchart illustrating an example of delivery service fee calculation processing performed by the server.

DETAILED DESCRIPTION

Figure 1:
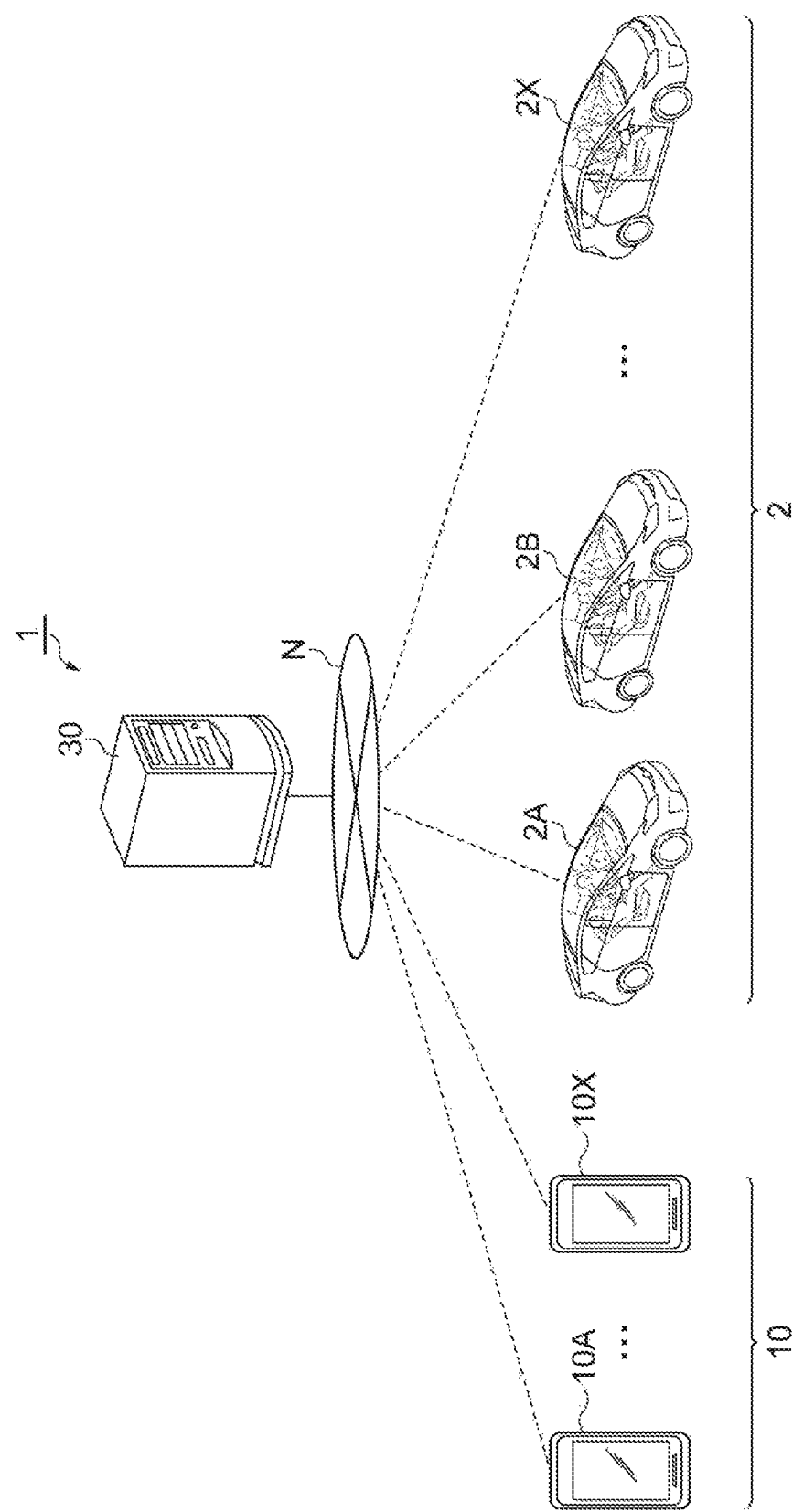
FIG. 1 is a diagram illustrating an example of a configuration of a vehicle dispatch system according to a first embodiment.

Hereinafter, exemplary embodiments will be described with reference to the drawings. In the description below, the same reference numerals will be given to the same or equivalent elements, and the description thereof will not be repeated.

First Embodiment

Vehicle Dispatch System

FIG. 1 is a diagram illustrating an example of a configuration of a vehicle dispatch system according to a first embodiment. The vehicle dispatch system dispatches an autonomous driving vehicle in response to a vehicle dispatch request from a user device. The vehicle dispatch system provides a combined service to the user, which is the combination of the transportation and the delivery. As illustrated in FIG. 1, a vehicle dispatch system 1 includes a plurality of user devices 10A, . . . , 10X, a server 30 (an example of a vehicle dispatch device), a plurality of vehicles 2A, 2B, . . . , 2X.

The plurality of user devices 10A, . . . , 10X are communicably connected to the server 30 via a network N. The network N is, for example, a wireless communication network. The plurality of user devices 10A, . . . , 10X are devices carried by a user. The user means a user of the vehicle dispatch system 1. The user may be registered in the vehicle dispatch system 1 in advance. An ID (user identification number) for identifying the user may be allocated to the registered user. The plurality of user devices 10A, . . . , 10X may have the same configuration. Hereafter, when describing a configuration common to the user devices, the description will be made using a user device 10 as a representative of the user devices.

The plurality of vehicles 2A, 2B, . . . , 2X are communicably connected to the server 30 via the network N. The plurality of vehicles 2A, 2B, . . . 2X are registered in the vehicle dispatch system 1 in advance. An ID (vehicle identification number) for identifying the vehicle may be allocated to the registered vehicle. The plurality of vehicles 2A, 2B, . . . 2X may be autonomous driving vehicles. The autonomous driving vehicle is a vehicle in which an autonomous driving system is mounted, which causes the vehicle to autonomously travel toward a destination set in advance. The autonomous driving vehicle travels autonomously without requiring a driver to perform a driving operation. Hereafter, when describing a configuration common to the vehicles, the description will be made using a vehicle 2 as a representative of the vehicles.

The server 30 manages a plurality of vehicles 2. When there is a vehicle dispatch request from the user via the user device 10, the server 30 determines the vehicle 2 to be dispatched and causes the vehicle 2 to the boarding position. The server 30 causes the vehicle 2 on which the user is on board to move to the destination. When there is a luggage delivery request together with the vehicle dispatch request from the user, the server 30 determines the vehicle 2 to be dispatched and causes the vehicle 2 to move to the boarding position. The server 30 causes the vehicle 2 with the user and the luggage to move to the destination, and then causes the luggage to be delivered to the delivery place.

The server 30 inquires the user via the user device 10 whether or not to use the combined service which is the combination of the transportation and the delivery. The server 30 determines a delivery service fee based on a user's alighting position (that is, the destination) and the delivery place, and presents the fees to the user via the user device 10. When a predetermined condition is satisfied, the server 30 can present a luggage delivery service fee discount plan that is a plan for a lower delivery service fee. The predetermined condition will be described later.

Hardware Configuration for Vehicle Dispatch System

Figure 2:
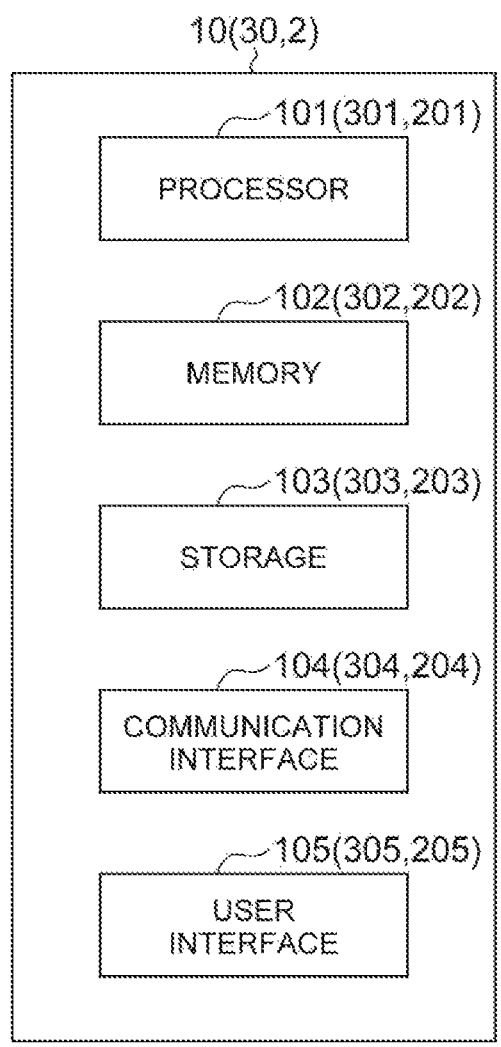
FIG. 2 is a diagram illustrating an example of a hardware configuration of configuration elements of the vehicle dispatch system.

FIG. 2 is a diagram illustrating an example of a hardware configuration of the configuration elements of the vehicle dispatch system. FIG. 2 illustrates an example of the hardware configuration of the user device 10, the server 30, and the vehicle 2. As illustrated in FIG. 2, the user device 10 includes a processor 101, a memory 102, a storage 103, a communication interface 104, and a user interface 105, and is configured as a general computer.

The processor 101 is an arithmetic unit such as a central processing unit (CPU). The memory 102 is a storage medium such as read only memory (ROM) or random access memory (RAM). The storage 103 is a storage medium such as a hard disk drive (HDD). The communication interface 104 is a communication device that realizes data communication. The user interface 105 is an output device such as a liquid crystal or a speaker, and an input device such as a touch panel or a microphone. The processor 101 performs overall management of the memory 102, the storage 103, the communication interface 104 and the user interface 105, and realizes the function of the user device which will be described later. The user device 10 may have a global positioning system (GPS) receiver.

Similarly to the user device 10 described above, the server 30 includes a processor 301, a memory 302, a storage 303 (an example of a storage unit), a communication interface 304, and a user interface 305. The processor 301 performs overall management of the memory 302, the storage 303, the communication interface 304, and the user interface 305, and realizes the function of the server 30 described later.

The vehicle 2 includes an electronic control unit (ECU). Similarly to the user device 10 described above, the ECU includes a processor 201, a memory 202, a storage 203, a communication interface 204, and a user interface 205. The processor 201 performs overall management of the memory 202, the storage 203, the communication interface 204 and the user interface 205, and realizes the function of the vehicle 2 described later. The vehicle 2 may include a GPS receiver. In addition, the vehicle 2 can include sensors and cameras, which is a general configuration of the autonomous driving vehicles.

Functional Configuration of the Vehicle Dispatch System

Figure 3:
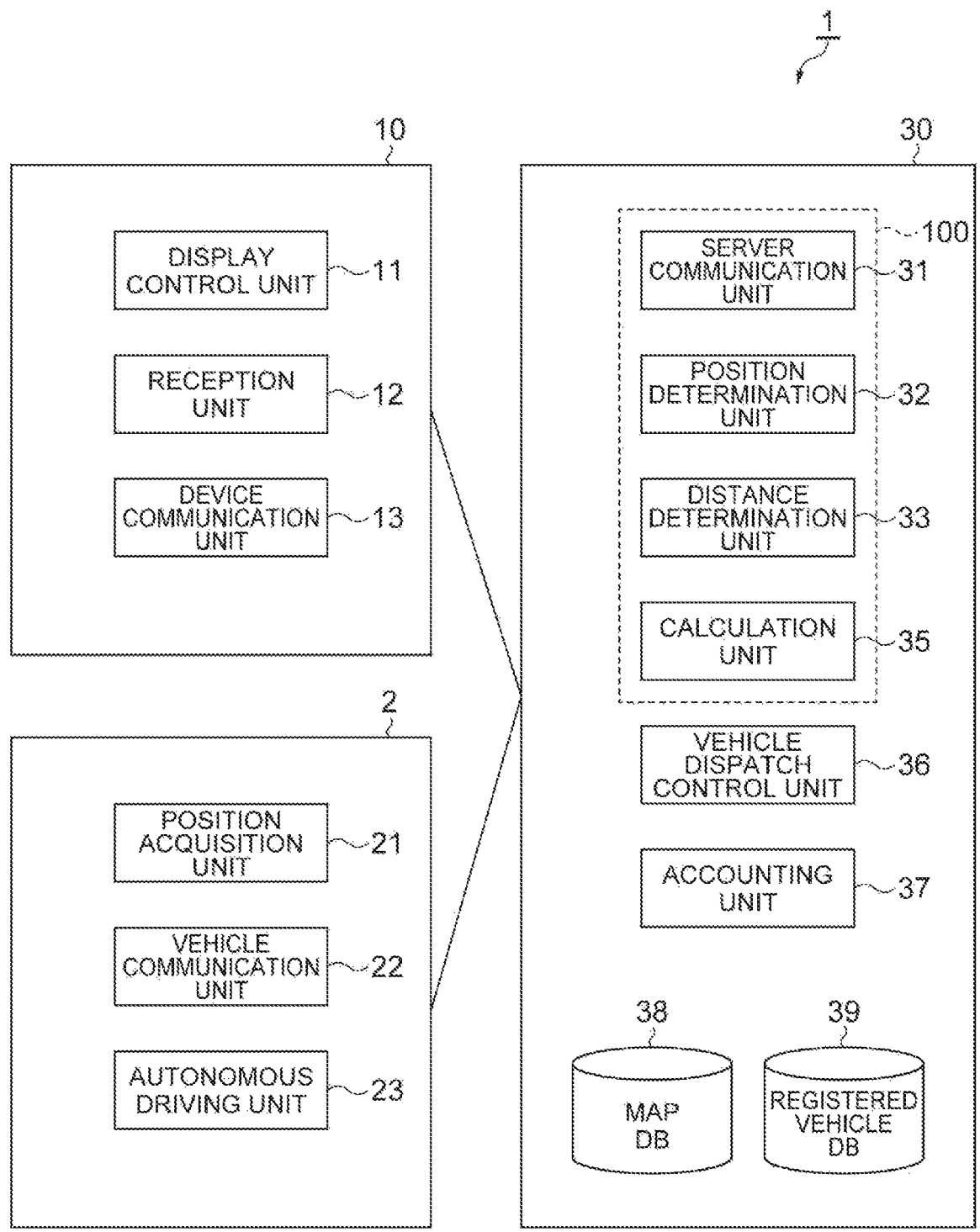
FIG. 3 is a block diagram illustrating an example of functions of the vehicle dispatch system.

First, a functional configuration of the user device 10 will be described. FIG. 3 is a block diagram illustrating an example of functions of the vehicle dispatch system 1. As illustrated in FIG. 3, the user device 10 includes a display control unit 11, a reception unit 12, and a device communication unit 13.

The display control unit 11 displays a display relating to the combined service on the user interface 105. The display control unit 11 is realized mainly by the processor 101 operating the user interface 105 while referring to the memory 102 and the storage 103. The information items displayed by the display control unit 11 includes information stored in at least one of the memory 102 and the storage 103 in advance, information determined by the user operation received by the reception unit 12, information received from the server 30 by the device communication unit 13, and the like.

Display Relating to Combined Service

Figure 4:
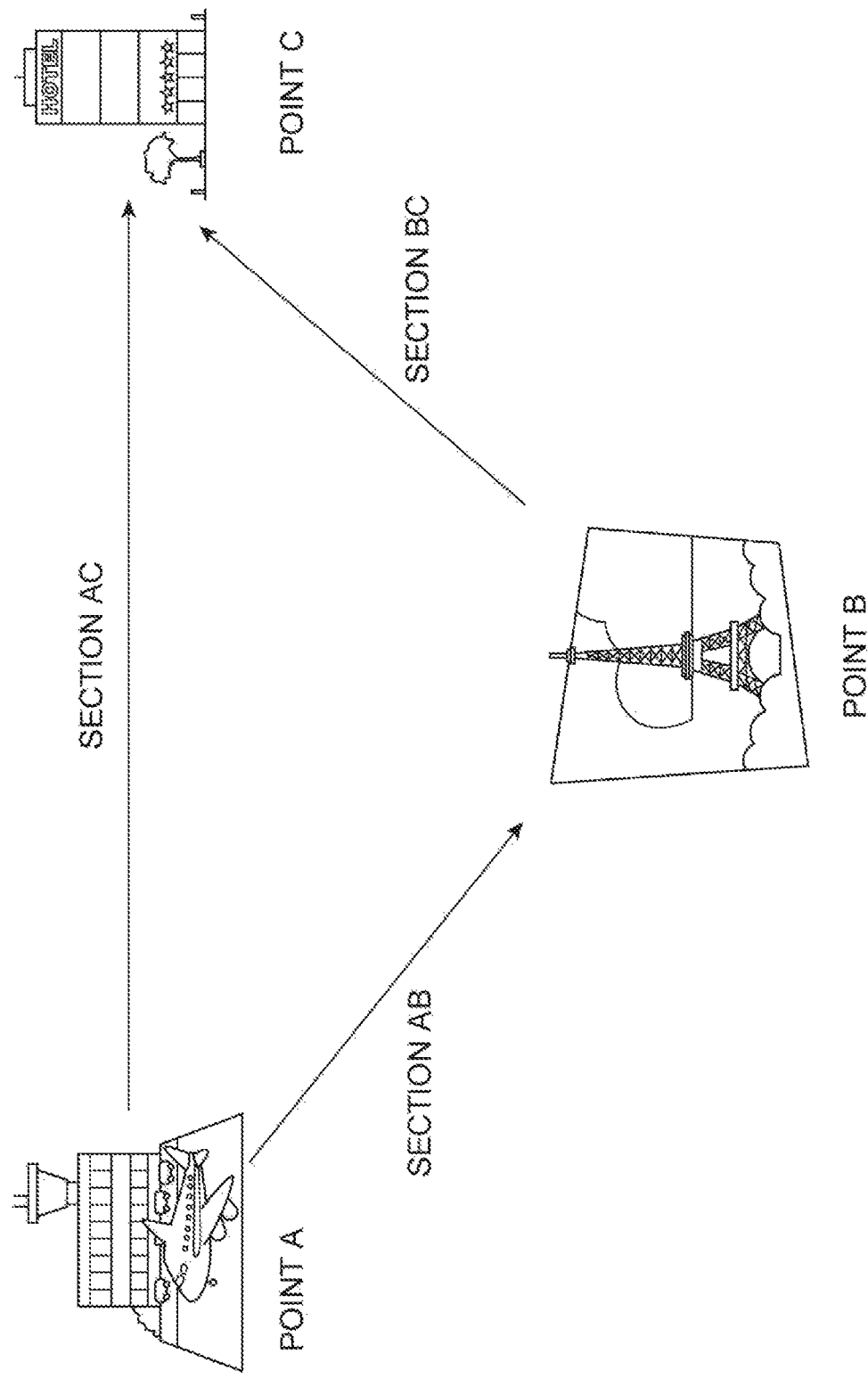
FIG. 4 is a diagram illustrating an example of a combined service in which transportation and a delivery are combined.

FIG. 4 is a diagram illustrating an example of a combined service which is a combination of transportation and a delivery. In FIG. 4, a case where a user arriving at the airport visits a sightseeing spot before checking-in at the hotel is illustrated. The airports, the sightseeing spots, the hotel, and the like are examples and are not limited thereto. A point A is a boarding position for the vehicle 2, and is an airport as an example in the drawing. The user boards the vehicle at the point A. The vehicle 2 travels through the section AB and transports the user to a point B. The point B is a destination (alighting position) of the user, and is a sightseeing spot as an example in the drawing. When the user wishes the luggage to be delivered to a point C, the vehicle 2 travels through a section BC with the luggage on board and delivers the luggage to the point C. The point C is a delivery place, and is a hotel as an example in the drawing. As described above, the combined service is a combination of the transportation and the delivery.

The destination and the delivery place are specified by the user operation as an example. As an example of a display relating to the combined service, the display control unit 11 displays a screen supporting the user's input of the destination and the delivery place on the user interface 105. For example, the display control unit 11 displays the input screen of the destination and the delivery place on the user interface 105. The display control unit 11 may display the map on the user interface 105. A position on which the user performs a tap operation on the map displayed on the user interface 105 of the user device 10 with the finger is at least one of the destination and the delivery place. At least one of the destination and the delivery place may be determined based on the position on the GPS receiver provided in the user device 10.

Display of Delivery Plan

The display control unit 11 displays a delivery plan as an example of the display relating to the combined service. The delivery plan includes the delivery service fee. The delivery service fee is determined by the server 30 based on the destination and the delivery place. The delivery plan may further include information such as scheduled delivery time, a recipient, and the like.

Display Relating to Intention Confirmation

The display control unit 11 may display a screen for confirming a user's intention to use the delivery plan on the user interface 105. An example of the confirmation screen is a screen displaying icons selectable by the user operation (for example, use buttons). For example, when the user performs a tap operation on the icon of the use button displayed on the user interface 105 of the user device 10 with the user's finger, an intention of agreeing to use the presented delivery plan will be expressed.

The reception unit 12 receives the user operation relating to the combined service. The reception unit 12 is realized mainly by the processor 101 operating the user interface 105 while referring to the memory 102 and the storage 103. The user operations relating to the combined service are, for example, an operation of inputting the destination, the delivery place the like, and an operation of selecting the use button.

The device communication unit 13 communicates with the server 30. The device communication unit 13 is realized mainly by the processor 101 operating the communication interface 104 while referring to the memory 102 and the storage 103. The device communication unit 13 transmits the vehicle dispatch request to the server 30. The vehicle dispatch request may include a desired pick-up time, a boarding position, a destination, a delivery place, an intention to use of the combined service expressed by the user (for example, user operation information on the use button), and the like. The device communication unit 13 receives information on the dispatched vehicle 2 from the server 30. As an example, the device communication unit 13 receives attributes (a vehicle identification number, a vehicle type, a color, and the like) of the vehicle 2, the boarding position, the pick-up time, a boarding security key, a security key for the luggage, and the like. The boarding security key is a key for authenticating the user who requested for the vehicle dispatch, and is, for example, a code for releasing the door lock of the vehicle 2. The security key for the luggage is a key for authenticating the authority to put in and out the luggage, and is, for example, a code for locking and unlocking the trunk of the vehicle 2.

Next, the functional configuration of the server 30 will be described. The server 30 includes a server communication unit 31 (an example of an acquisition unit), a position determination unit 32, a distance determination unit 33, a calculation unit 35, a vehicle dispatch control unit 36 and an accounting unit 37, a map DB 38, and a registered vehicle DB 39. The vehicle dispatch device 100 includes the server communication unit 31, the position determination unit 32, the distance determination unit 33, and the calculation unit 35.

The server communication unit 31 communicates with the user device 10 and the vehicle 2. The server communication unit 31 is realized mainly by the processor 301 operating the communication interface 304 while referring to the memory 302 and the storage 303. The server communication unit 31 acquires the user's vehicle dispatch request including the boarding position, the destination, and the delivery place of the luggage. The user's vehicle dispatch request is acquired via the user device 10.

The server communication unit 31 further communicates with the vehicle 2. The server communication unit 31 acquires information on the vehicle 2 (position information, a result of detection performed by the sensor, and the like).

The position determination unit 32 determines whether or not the destination and the delivery place match each other. The position determination unit 32 is realized mainly by the processor 301 performing the calculation while referring to the memory 302 and the storage 303. The position determination unit 32 determines whether or not the positions of the destination and the delivery place acquired via the server communication unit 31 are the same.

The position determination unit 32 may determine whether or not the destination and the delivery place match each other referring to the map DB 38. The map DB 38 stores map information. The map DB 38 is stored in the storage 303 of the server 30. Map information is data in which position information on roads, road structures, buildings, and the like are stored. In this case, the position determination unit 32 can determine that the destination and the delivery place match each other when the positions of the destination and the delivery place are not exactly the same. For example, even if the position coordinates of the destination and the delivery place are not exactly the same, when the destination and the delivery place are intended for the same facility, the position determination unit 32 can determine that the destination and the delivery place match each other. In other words, the position determination unit 32 may determine whether or not the destination and the delivery place match each other considering a certain degree of error.

The distance determination unit 33 determines whether or not a boarding distance from the boarding position to the destination is equal to or longer than a reference boarding distance. The distance determination unit 33 is realized mainly by the processor 301 performs the calculation while referring to the memory 302 and the storage 303. The reference boarding distance is a distance for determining a boarding distance set in advance. The reference boarding distance can be appropriately set by a provider that provides the combined service. As will be described later, as the reference boarding distance is set shorter, a scope of luggage delivery service fee discount plan becomes wider. Therefore, it becomes easy for the user to use the combined service which is the combination of the transportation and the delivery using the autonomous driving vehicle.

The calculation unit 35 calculates the delivery service fee to the delivery place. The calculation unit 35 is realized mainly by the processor 301 performing the calculation while referring to the memory 302 and the storage 303. The calculation unit 35 can calculate the delivery service fee using various methods. For example, the calculation unit 35 may calculate the delivery service fee according to a distance between a delivery source and a delivery destination (the delivery place), or may calculate the delivery service fee based on a fee table in which the delivery source, the delivery destination, and the delivery service fee are associated with each other.

When it is determined by the position determination unit 32 that the destination and the delivery place do not match each other and it is determined by the distance determination unit 33 that the boarding distance is not equal to or longer than the reference boarding distance, the calculation unit 35 calculates a first delivery service fee as the delivery service fee. That is, the first delivery service fee is a delivery service fee for the user whose boarding distance is shorter than a certain distance. As an example, the first delivery service fee is determined based on at least one of the distance from the destination to the delivery place (the section BC in FIG. 4) and the relation between the destination and the delivery place. That is, the distance from the boarding position to the destination (the section AB in FIG. 4) and the distance from the boarding position to the delivery place (the section AC in FIG. 4) are not considered in calculating the first delivery service fee.

When it is determined by the position determination unit 32 that the destination and the delivery place do not match each other and it is determined by the distance determination unit 33 that the boarding distance is equal to or longer than the reference boarding distance, the calculation unit 35 calculates a second delivery service fee which is lower than the first delivery service fee as the delivery service fee. That is, the second delivery service fee is a delivery service fee for a user whose boarding distance exceeds a certain distance, and is cheaper than the first delivery service fee. As an example, the second delivery service fee may be calculated by discounting a constant amount from the first delivery service fee, or may be calculated by discounting a predetermined rate from the first delivery service fee. Alternatively, the second delivery service fee may be calculated by increasing the discount amount as the distance from the boarding position to the destination (the section AB in FIG. 4) increases. Alternatively, the second delivery service fee may be free. As described above, the calculation unit 35 lowers the usage fee of the delivery service for the user who uses the long distance transportation service.

The calculation unit 35 may present the calculated delivery service fee to the user via the server communication unit 31 and the user device 10.

The vehicle dispatch control unit 36 selects a vehicle to be dispatched based on the boarding position, the destination, and the delivery place. The vehicle dispatch control unit 36 selects the vehicle to be dispatched referring to the registered vehicle DB 39. The registered vehicle DB 39 stores the information on the vehicle 2. The registered vehicle DB 39 is stored in the storage 303 of the server 30. The registered vehicle DB 39 stores the vehicle identification number of the vehicle 2 and the information on the vehicle 2 in association with each other.

FIG. 5 illustrate an example of the data held in the server 30. FIG. 5 is an example of information stored in the registered vehicle DB 39. As illustrated in FIG. 5, the registered vehicle DB 39 stores a current position of the vehicle, a travel plan, and the like in association with the vehicle identification number. The position of the vehicle is a position on the map, for example, the latitude and the longitude. The travel plan is the dispatch schedule of vehicle 2. The travel plan is the dispatch schedule of vehicle 2.

In FIG. 5, a vehicle identification number "registered vehicle 2A", a position of the vehicle "latitude: XX, longitude: XX", a travel plan "travel plan A" are stored in association with each other. A vehicle identification number "registered vehicle 2B", a position of the vehicle "latitude: XX, longitude: XX", a travel plan "travel plan B" are stored in association with each other. A vehicle identification number "registered vehicle 2C", a position of the vehicle "latitude: XX, longitude: XX", a travel plan "travel plan C" are stored in association with each other.

The vehicle dispatch control unit 36 manages the information in the registered vehicle DB 39. The vehicle dispatch control unit 36 sequentially updates the information in the registered vehicle DB 39 based on the information obtained by the communication with the vehicle 2. The vehicle dispatch control unit 36 presents the attribute (vehicle identification number, vehicle type, color, and the like) of the vehicle 2, the boarding position, the pick-up time, and the like to the user via the server communication unit 31 and the user device 10. The vehicle dispatch control unit 36 transmits the boarding position, the pick-up time, the destination, and the delivery place to the vehicle 2 via the server communication unit 31. The vehicle dispatch control unit 36 may transmit the information on the user who requested for the vehicle dispatch, to the vehicle 2. The vehicle dispatch control unit 36 may generate an authentication key such as a boarding security key and a security key for the luggage, and present the keys to the user and the vehicle 2.

The accounting unit 37 calculates a fee for the combined service. The accounting unit 37 calculates the fee for the combined service by combining the fee for the transportation service and the fee for the delivery service calculated by the calculation unit 35. For example, the accounting unit 37 may sum up the fee for the transportation service and the fee for the delivery service. The accounting unit 37 transmits the calculated fee to the user via the server communication unit 31. The accounting unit 37 may perform accounting processing in cooperation with a credit server (not illustrated).

Next, a functional configuration of the vehicle 2 will be described. As an example, the vehicle 2 includes a position acquisition unit 21, a vehicle communication unit 22, and an autonomous driving unit 23.

The position acquisition unit 21 acquires the position of the vehicle 2 on the map. The position acquisition unit 21 is realized mainly by the processor 201 operating based on the information obtained from the GPS receiver.

The vehicle communication unit 22 communicates with the server 30. The vehicle communication unit 22 is realized mainly by the processor 201 operating the communication interface 204 while referring to the memory 202 and the storage 203. Transmission information includes information relating to the position of the vehicle 2. Received information includes information on the boarding position, the pick-up time, the destination, and delivery place. The received information may include information on the user who requested for the vehicle dispatch.

The autonomous driving unit 23 causes the vehicle 2 to travel with the autonomous driving. The autonomous driving unit 23 realizes the autonomous driving based on detection information from sensors (not illustrated) or the like and the map information. The boarding position, the pick-up time, the destination, and the delivery place are incorporated in the travel plan of the vehicle 2. The autonomous driving unit 23 causes the vehicle 2 to travel so as to be in time for the received pick-up time at the boarding position. The autonomous driving unit 23 causes the vehicle 2 to travel from the boarding position and to stop at the destination. The autonomous driving unit 23 causes the vehicle 2 to travel from the destination to the delivery place with the luggage on board after the user alights from the vehicle 2.

When the vehicle 2 receives the authentication key from the server 30, the deposit/withdrawal of the luggage is performed using the authentication key.

Screen Example

FIGS. 6A, 6B, and 6C are screen examples of a user device displaying information relating to the combined service which is the combination of the transportation and the delivery. The screen examples illustrated in FIGS. 6A, 6B, and 6C are displayed by the display control unit 11.

FIG. 6A is a screen example G1 that supports inputting of the destination and the delivery place. As illustrated in FIG. 6A, in the screen example G1, a form in which a destination can be input by the user operation, a confirmation message asking whether or not to perform the luggage delivery, icons for confirming the intention, and a form in which the delivery place can be input by user operation, are displayed. The forms in which the destination and delivery place can be input may be pull-down type forms. FIGS. 6B and 6C are screen examples G2 and G3 displaying the delivery plan and asking the confirmation of the intention whether or not to agree with the delivery plan. The screen example G2 is a screen example displaying the luggage delivery fee discount plan, and thus, the second delivery service fee is displayed as the delivery service fee. The screen example G3 is a screen example displaying the luggage delivery plan, and thus, the first delivery service fee is displayed as the delivery service fee. In the screen examples G2 and G3, a confirmation message whether or not to agree with the delivery plan and icons for the confirmation of the intention, are displayed. The user can make a reservation of the combined service which is the combination of the transportation and the delivery by operating the screen examples G1, G2, and G3.

Delivery Service Fee Calculation Processing

Hereinafter, an example of delivery service fee calculation processing will be disclosed. FIG. 7 is a flowchart illustrating an example of the delivery service fee calculation processing performed by the server. The flowchart in FIG. 7 is executed by the server 30. The flowchart in FIG. 7 is executed, for example, at the timing when the server 30 receives the vehicle dispatch request from the user device 10.

As illustrated in FIG. 7, as luggage determination processing (S10), the calculation unit 35 of the server 30 determines whether or not the luggage delivery is requested. For example, when the delivery place is included in the vehicle dispatch request acquired from the user device 10, or the information indicating the agreement to the delivery plan is included in the vehicle dispatch request, the calculation unit 35 determines that the luggage delivery is requested.

When it is determined that the luggage delivery is requested (YES in S10), as position determination processing (S12), the position determination unit 32 determines whether or not the destination and the delivery place match with each other.

When it is determined that the destination and delivery place do not match each other (NO in S12), as the distance determination processing (S14), the distance determination unit 33 determines whether or not the boarding distance from the boarding position to the destination is equal to or longer than the reference boarding distance.

When it is determined that the boarding distance from the boarding position to the destination is not equal to or longer than the reference boarding distance (NO in S14), as the first delivery service fee calculation processing (S24), the calculation unit 35 calculates the first delivery service fee based on the destination and the delivery place. Subsequently, as delivery plan presentation processing (S26), the calculation unit 35 presents the first delivery service fee to the user (for example, screen example G3 in FIG. 6C).

When it is determined that the boarding distance from the boarding position to the destination is equal to or longer than the reference boarding distance (YES in S14), as the second delivery service fee calculation processing (S16), the calculation unit 35 calculates the second delivery service fee which is lower than the first delivery service fee. When the second delivery service fee is set to be free, the calculation unit 35 does not perform the second delivery service fee calculation processing (S16). Subsequently, as the delivery fee discount plan presentation processing (S18), the calculation unit 35 presents the second delivery service fee to the user (for example, screen example G2 in FIG. 6B).

When it is determined that luggage delivery is not requested (NO in S10), when it is determined that the destination and the delivery place matches each other (YES in S12), when the delivery fee discount plan presentation processing (S18) ends, or when the delivery plan presentation processing (S26) ends, the flowchart illustrated in FIG. 7 ends. As above, the delivery service fee calculation processing ends.

Summary of First Embodiment

In the vehicle dispatch device 100, when it is determined by the distance determination unit 33 that the boarding distance is not equal to or longer than the reference boarding distance, the calculation unit 35 calculates the first delivery service fee, and when it is determined by the distance determination unit 33 that the boarding distance is equal to or longer than the reference boarding distance, the calculation unit 35 calculates the second delivery service fee that is lower than the first delivery service fee. As described above, since the delivery service fee is calculated lower when the boarding distance is equal to or longer than the reference boarding distance, it is easy for the user to use not only the transportation service using the autonomous driving vehicle but also the delivery service using the autonomous driving vehicle. Accordingly, the vehicle dispatch device 100 can promote the use of the combined service which is the combination of the transportation and the delivery.

Second Embodiment

A vehicle dispatch system 1A in a second embodiment is different from the vehicle dispatch system 1 in the first embodiment in a point that the delivery service fee calculation method performed by the calculation unit 35 is partially different, and others are the same as that in the first embodiment. In the second embodiment, the descriptions same as that in the first embodiment will not be repeated.

Figure 8:
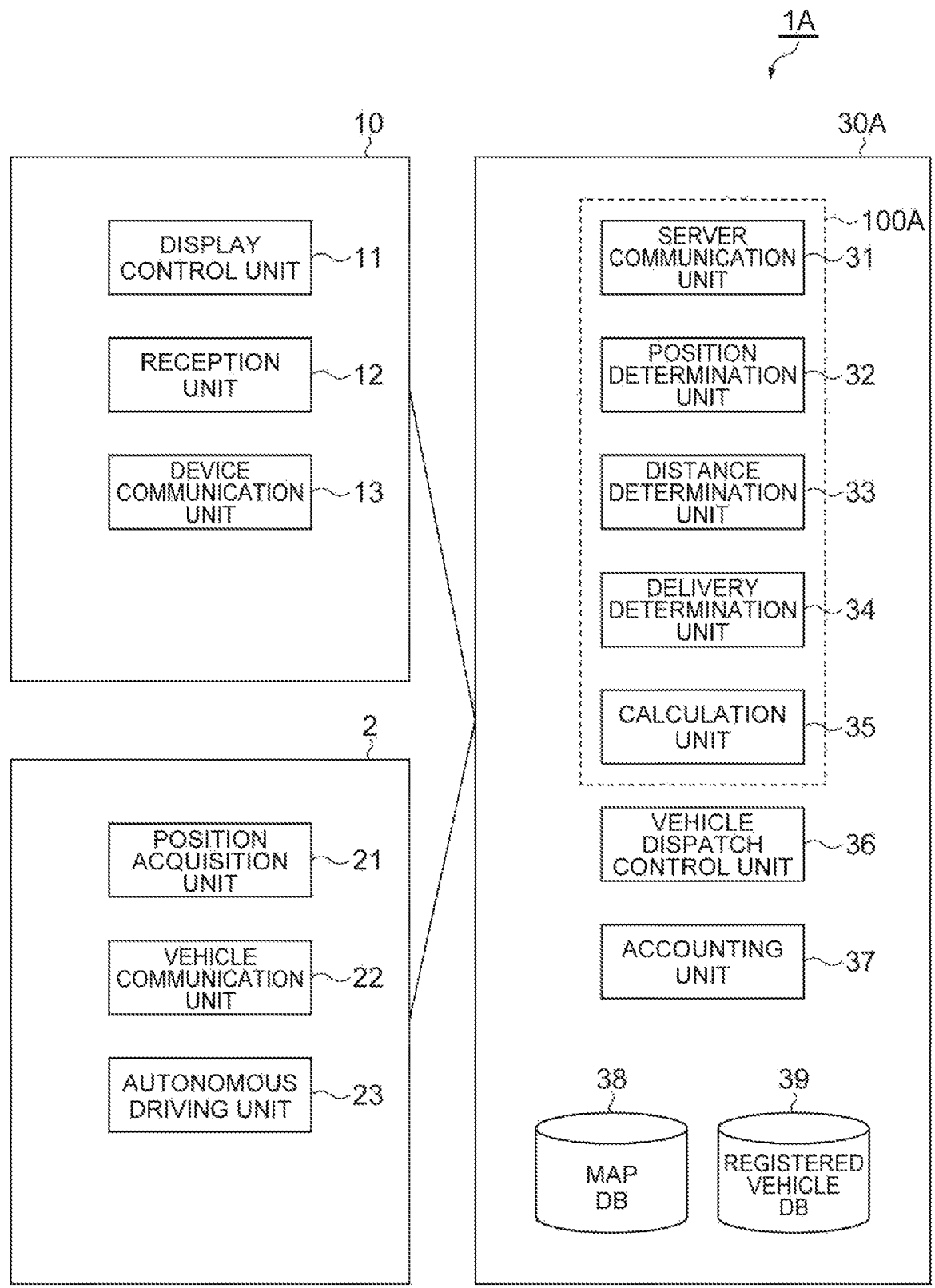
FIG. 8 is a diagram illustrating an example of a configuration of a vehicle dispatch system according to a second embodiment.

FIG. 8 is a diagram illustrating an example of a configuration of the vehicle dispatch system in the second embodiment. As illustrated in FIG. 8, a server 30A includes a vehicle dispatch device 100A. The vehicle dispatch device 100A is different from the vehicle dispatch device 100 in a point that a delivery determination unit 34 is included, and others are the same.

The delivery determination unit 34 determines whether or not a delivery distance from the destination to the delivery place is equal to or shorter than a reference delivery distance. The delivery determination unit 34 is realized mainly by the processor 301 performing the calculation while referring to the memory 302 and the storage 303. The reference delivery distance is a predetermined distance for determining the delivery distance. The reference delivery distance can be appropriately set by a provider that provides the combined service. As will be described later, as the reference delivery distance is set longer, a scope of luggage delivery service fee discount plan becomes wider. Therefore, it becomes easy for the user to use the combined service which is the combination of the transportation and the delivery using the autonomous driving vehicle.

Delivery Service Fee Calculation Processing

Figure 9:
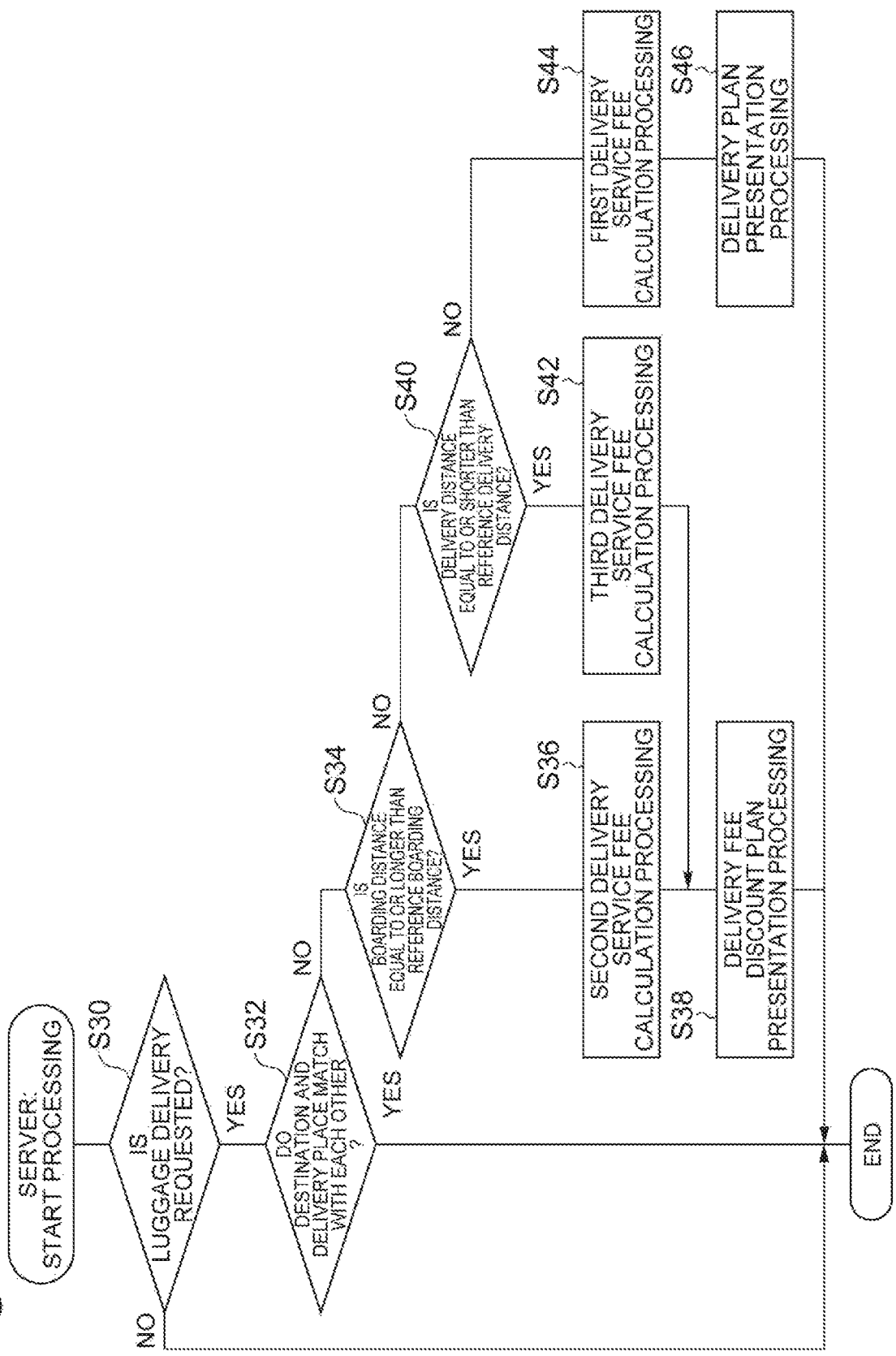
FIG. 9 is a flowchart illustrating an example of delivery service fee calculation processing performed by the server.

Hereinafter, an example of delivery service fee calculation processing will be disclosed. FIG. 9 is a flowchart illustrating an example of delivery service fee calculation processing performed by the server. The flowchart in FIG. 9 is executed by the server 30. The flowchart in FIG. 9 is executed, for example, at the timing when the server 30 receives the vehicle dispatch request from the user device 10.

Luggage determination processing (S30), position determination processing (S32) and distance determination processing (S34) in FIG. 9 are respectively the same as the luggage determination processing (S10), the position determination processing (S12), and the distance determination processing (S14) in FIG. 7.

When it is determined that the boarding distance from the boarding position to the destination is equal to or longer than the reference boarding distance (YES in S34), as the second delivery service fee calculation processing (S36), the calculation unit 35 calculates a second delivery service fee which is lower than the first delivery service fee. When the second delivery service fee is set to be free, the calculation unit 35 does not perform the second delivery service fee calculation processing (S36).

When it is determined that the boarding distance from the boarding position to the destination is not equal to or longer than the reference boarding distance (NO in S34), as the delivery determination processing (S40), the delivery determination unit 34 determines whether or not the delivery distance from the destination to the delivery place is equal to or shorter than the reference delivery distance.

When it is determined that the delivery distance is equal to or shorter than the reference delivery distance (YES in S40), as third delivery service fee calculation processing (S42), the calculation unit 35 calculates a third delivery service fee which is lower than the first delivery service fee. If the third delivery service fee is set to be free, the calculation unit 35 does not perform the third delivery service fee calculation processing (S42).

When the second delivery service fee calculation processing (S36) ends, or when the third delivery service fee calculation processing (S42) ends, as the delivery fee discount plan presentation processing (S38), the calculation unit 35 presents the delivery service fee to the user. When the second delivery service fee is presented, the delivery fee discount plan presentation processing (S38) is the same as the delivery fee discount plan presentation processing (S18) in FIG. 7.

When it is determined that the boarding distance is not equal to or shorter than the reference boarding distance (NO in S40), the process proceeds to the first delivery service fee calculation processing (S44) and the delivery plan presentation processing (S46). The first delivery service fee calculation processing (S44) and the delivery plan presentation processing (S46) are respectively the same as the first delivery service fee calculation processing (S24) and the delivery plan presentation processing (S26) in FIG. 7.

When it is determined that the luggage delivery is not requested (NO in S30), when it is determined that the destination and the delivery place matches each other (YES in S32), when the delivery fee discount plan presentation processing (S38) ends, or when the delivery plan presentation processing (S46) ends, the flowchart illustrated in FIG. 9 ends. As above, the delivery service fee calculation processing ends.

Summary of Second Embodiment

The vehicle dispatch device 100A achieves the same effects as the vehicle dispatch device 100. Furthermore, in the vehicle dispatch device 100A, even if the boarding distance is not equal to or longer than the reference boarding distance, when the delivery distance is equal to or shorter than the reference delivery distance, the delivery service fee is calculated lower. Therefore, the vehicle dispatch device 100A can further promote the use of combined service which is the combination of the transportation and the delivery.

Third Embodiment

A vehicle dispatch system in a third embodiment is different from the vehicle dispatch system 1 in the first embodiment in a point that the existence of the delivery fee discount service is presented to the user before the user designates the delivery place, and others are the same as that in the first embodiment. In the third embodiment, the descriptions same as that in the first embodiment will not be repeated.

Figure 10:
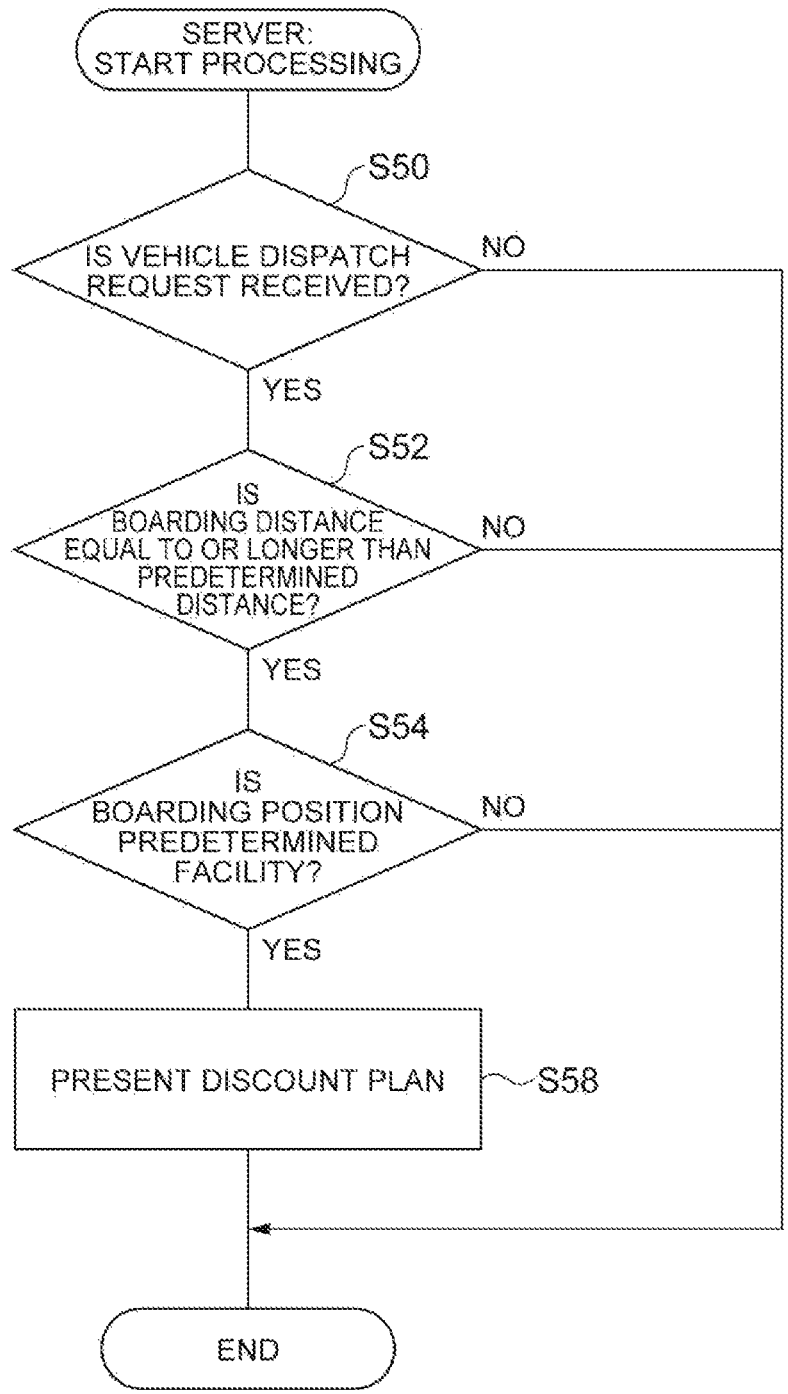
FIG. 10 is a flowchart illustrating an example of discount plan presentation processing performed by the server.

FIG. 10 is a flowchart illustrating an example of discount plan presentation processing performed by the server. The flowchart illustrated in FIG. 10 is executed by the server 30. The flowchart in FIG. 10 is executed, for example, at the timing when the server 30 starts the communication with the user device 10.

As illustrated in FIG. 10, as request determination processing (S50), the server 30 determines whether or not a vehicle dispatch request is received from the user. The vehicle dispatch request does not necessarily need to include a delivery place.

When it is determined that the vehicle dispatch request is received from the user (YES in S50), as the distance determination processing (S52), the server 30 determines whether or not the boarding distance is equal to or longer than a predetermined distance. As an example, the predetermined distance may be the reference boarding distance.

When it is determined that the boarding distance is equal to or longer than the predetermined distance (YES in S52), as facility determination processing (S54), the server 30 determines whether or not the boarding position is a predetermined facility. For example, the server 30 determines whether or not the boarding position is the predetermined facility based on the boarding position and the map information in the map DB 38. The "predetermined facility" is a facility specified in advance, and is a facility relating to the transportation. Examples of the predetermined facility include airports or main stations (Shinkansen stations, express railway stops).

When it is determined that the boarding position is the predetermined facility (YES in S54), as discount plan presentation processing (S58), the server 30 presents a delivery service fee discount plan to the user. For example, the server 30 presents a plan for reducing a predetermined fee from a general delivery service fee calculated according to a distance, a plan for reducing a predetermined rate from the general delivery service fee, a plan for making the delivery service fee uniformly be free.

When it is determined that the vehicle dispatch request is not received from the user (NO in S50), when it is determined that the boarding distance is not equal to or longer than the predetermined distance (NO in S52), when it is determined that the boarding position is not the predetermined facility (NO in S54), or when the discount plan presentation processing (S58) ends, the flowchart illustrated in FIG. 10 ends. As above, the discount plan presentation processing ends.

Figure 11:
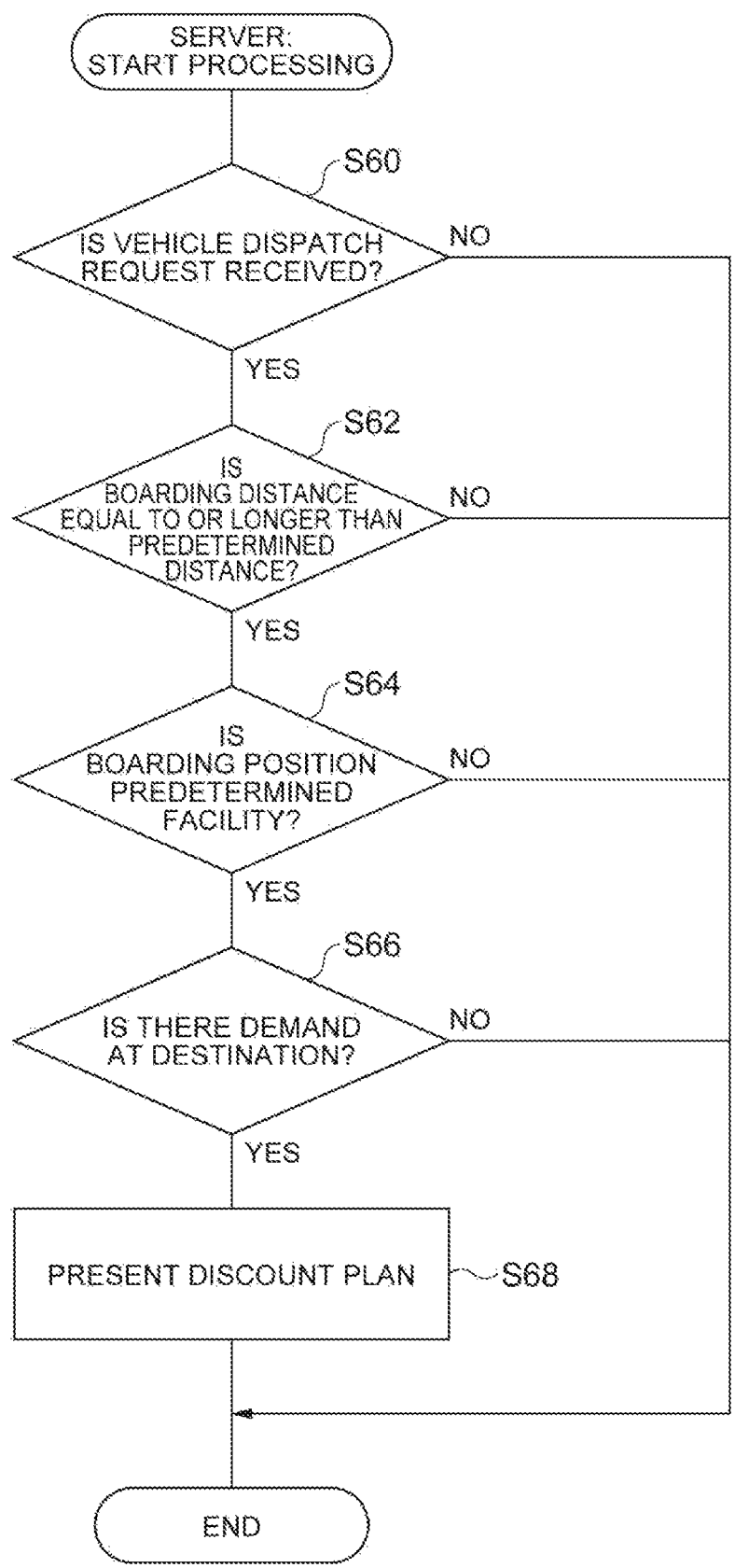
FIG. 11 is a flowchart illustrating an example of another discount plan presentation processing performed by the server.

FIG. 11 is a flowchart illustrating another example of the discount plan presentation processing performed by the server. The flowchart in FIG. 11 is executed by the server 30. The flowchart in FIG. 11 is executed, for example, at the timing when the server 30 starts communication with the user device 10.

Request determination processing (S60), distance determination processing (S62), and facility determination processing (S64) in FIG. 11 are respectively the same as the request determination processing (S50), the distance determination processing (S52), and the facility determination processing (S54) in FIG. 10.

When it is determined that the boarding position is the determined facility (YES in S64), as demand determination processing (S66), the server 30 determines whether there is a demand for the transportation service at the destination or not. The server 30 determines, for example, whether there is a demand for the transportation service or not based on the current situation at the destination. For example, the server 30 determines that there is a demand for the transportation service when an event is held at the destination. Alternatively, the server 30 may determine that there is a demand for the transportation service when the congestion degree at the destination is equal to or higher than a predetermined value. Alternatively, the server 30 may determine that there is a demand for the transportation service when the past record (for example, the number of people who visited the destination on the previous day) is equal to or greater than a predetermined reference. Alternatively, the server 30 may predict the demand referring to a vehicle dispatch plan stored in the registered vehicle DB 39.

When it is determined that there is a demand for the transportation service at the destination (YES in S66), the process proceeds to the discount plan presentation processing (S68). The discount plan presentation processing (S68) is the same as the discount plan presentation processing (S58) in FIG. 10.

When it is determined that the vehicle dispatch request is not received from the user (NO in S60), when it is determined that the boarding distance is not equal to or longer than the predetermined distance (NO in S62), when it is determined that the boarding position is not the determined facility (NO in S64), when it is determined that there is no demand for the transportation service at the destination (NO in S66), or when the discount plan presentation processing (S68) ends, the flowchart illustrated in FIG. 11 ends. As above, the discount plan presentation processing ends.

Summary of Third Embodiment

Since the server 30 can present the existence of the delivery fee discount service to the user before the user designates the delivery place, the user who does not know the combined service can acknowledge the service.

Fourth Embodiment

A vehicle dispatch system in a fourth embodiment is different from the vehicle dispatch system 1 in the first embodiment in a point that details of picking up the luggage is disclosed, and others are the same. In the fourth embodiment, the descriptions same as that in the first embodiment will not be repeated.

Figure 12:
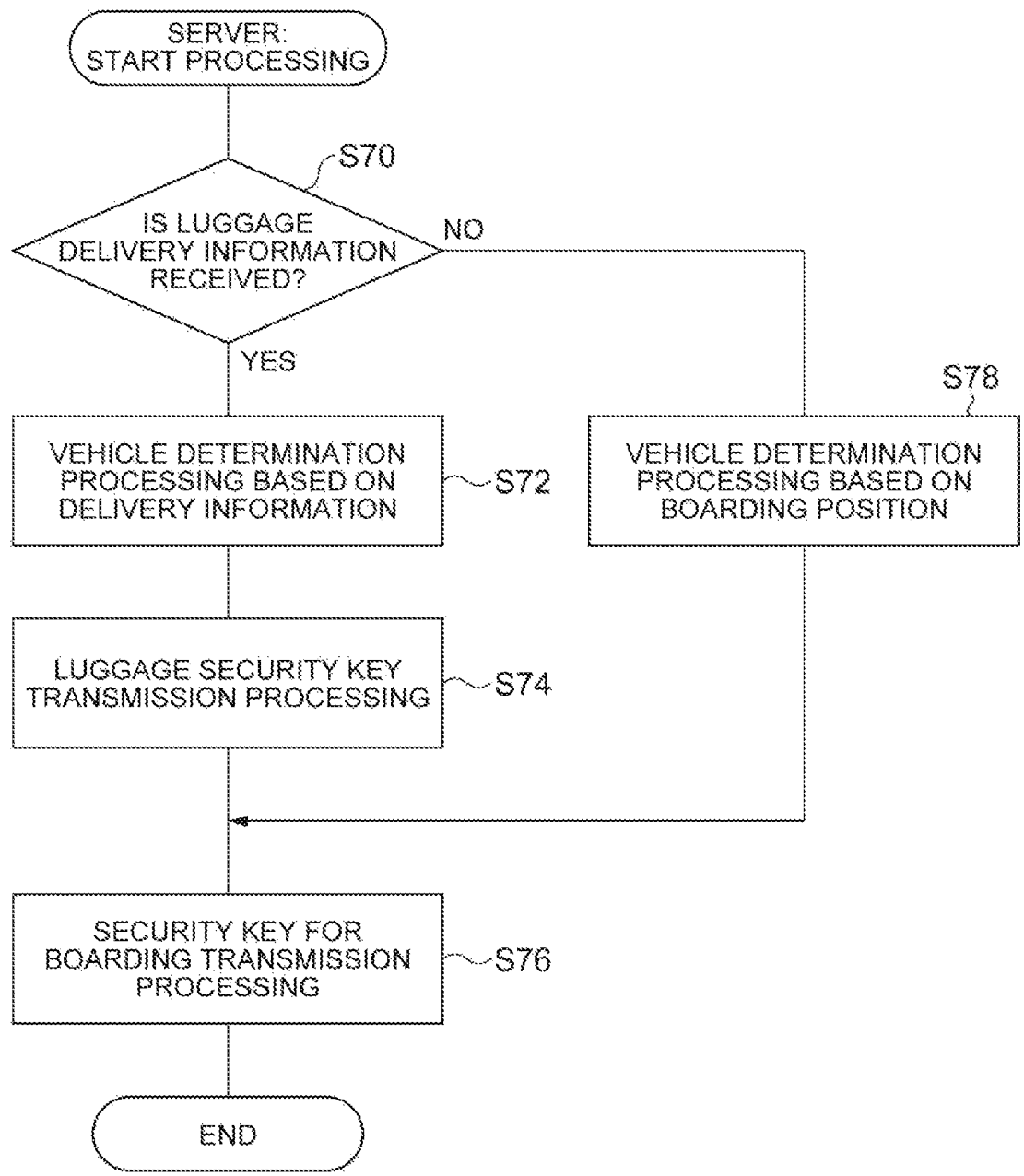
FIG. 12 is a flowchart illustrating an example of vehicle dispatch processing performed by the server.

FIG. 12 is a flowchart illustrating an example of the vehicle dispatch processing performed by server. The flowchart in FIG. 12 is executed by the server 30. The flowchart in FIG. 12 is executed, for example, at the timing when the server 30 receives the vehicle dispatch request from the user device 10.

As illustrated in FIG. 12, as luggage determination processing (S70), the server 30 determines whether or not the luggage delivery is requested. For example, when the delivery place is included in the vehicle dispatch request acquired from the user device 10, the server 30 determines that the luggage delivery is requested.

When it is determined that the luggage delivery is requested (YES in S70), as vehicle determination processing (S72), the server 30 determines a vehicle for delivery based on the delivery information (for example, the delivery place). For example, the server 30 selects a vehicle that can move to the boarding position, the destination, and the delivery place based on the position of the vehicle stored in the registered vehicle DB 39, the travel plan, and the like. When there are a plurality of movable vehicles, the server 30 selects a vehicle that can move to the boarding position within a shortest time.

Subsequently, as transmission processing (S74), the server 30 transmits a luggage security key to the user and the vehicle to be dispatched. As an example, the luggage security key may be set using information relating to the delivery place. For example, when the delivery place is a hotel, the luggage security key may be a hotel reservation number. Alternatively, when the delivery place is a hotel and the hotel has been notified of the airport ticket number, the luggage security key may be the airport ticket number. Alternatively, when the user visits somewhere else before heading to the airport, the airport will be the delivery place. In this case, the luggage security key may be an airport ticket number. Alternatively, when the user visits somewhere else before heading home, the home will be the delivery place. In this case, the luggage security key may be a number associated with the home. In this way, the user can receive the luggage at the delivery place.

When is determined that the luggage delivery is not requested (NO in S70), as the vehicle determination processing (S78), the server 30 determines the vehicle for delivery based on the boarding position. For example, the server 30 selects a vehicle that can move to a boarding position and a destination based on the position of the vehicle stored in the registered vehicle DB 39, the travel plan, and the like. When there are a plurality of movable vehicles, the server 30 selects a vehicle that can move to the boarding position within a shortest time.

When the transmission processing (S74) ends, or when the vehicle determination processing (S78) ends, as transmission processing (S76), the server 30 transmits a boarding security key to the user and to the vehicle to be dispatched. When the transmission processing (S76) ends, the flowchart illustrated in FIG. 12 ends. As above, the vehicle dispatch processing ends.

Figure 13:
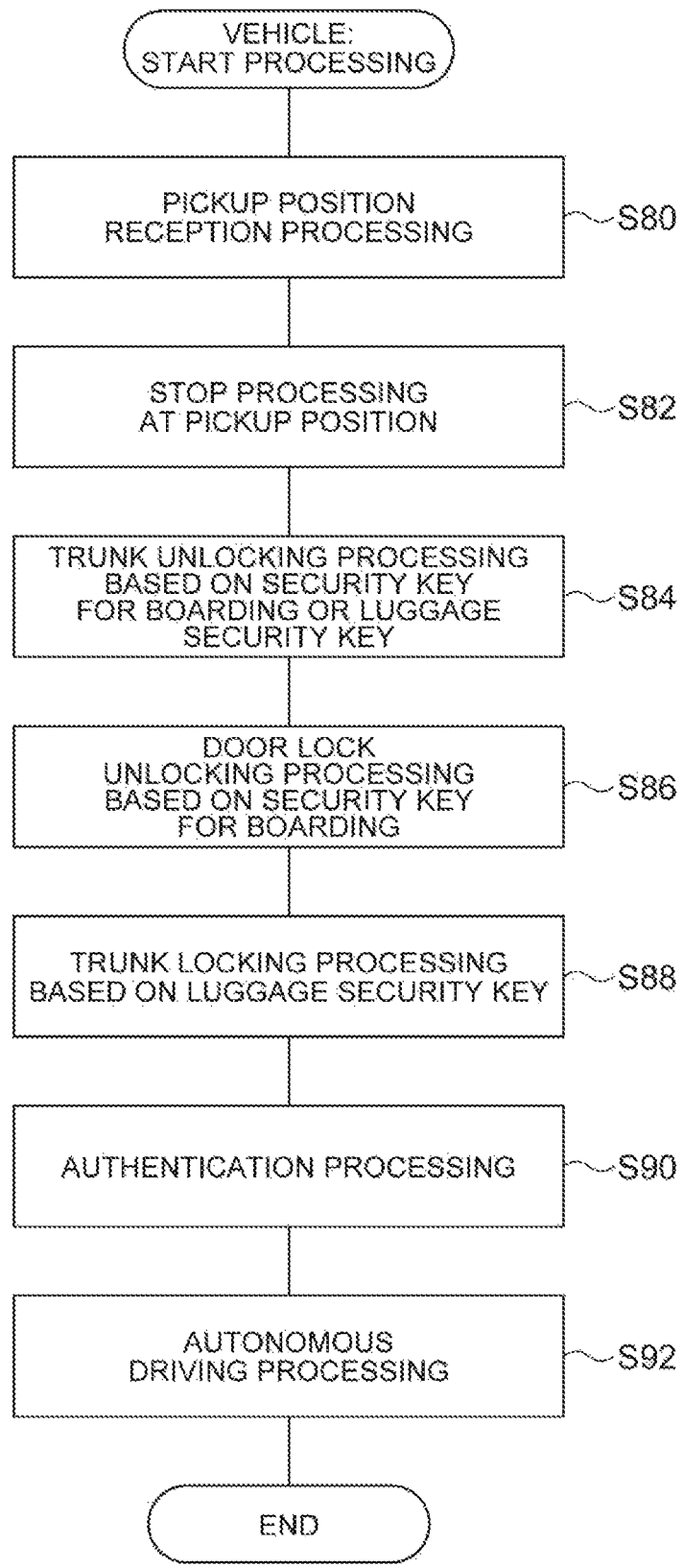
FIG. 13 is a flowchart illustrating an example of pick-up processing performed by the vehicle.

FIG. 13 is a flowchart illustrating an example of pick-up processing performed by the vehicle. The flowchart in FIG. 13 is executed by the vehicle 2. The flowchart in FIG. 13 is executed, for example, at a timing when the vehicle 2 receives a vehicle dispatch instruction from the server 30.

As illustrated in FIG. 13, as reception processing (S80), the vehicle 2 receives a boarding position (a luggage pick-up position) of the user from the server 30. The vehicle 2 moves to the luggage pick-up position.

Subsequently, as a stop processing (S82), the vehicle 2 stops at the luggage pick-up position. As trunk unlocking processing (S84), the vehicle 2 respectively collates at least one of the boarding security key and the luggage security key presented by the user with at least one of the boarding security key and the luggage security key received from the server 30, and unlocks the trunk when one of the keys is authenticated. The user loads the luggage in the trunk.

As door lock unlocking processing (S86), the vehicle 2 collates the boarding security key presented by the user with the boarding security key received from the server 30, and unlocks the door lock when the key is authenticated.

As trunk locking processing (S88), the vehicle 2 collates the luggage security key presented by the user with the luggage security key received from the server 30, and locks the trunk when the key is authenticated.

As authentication processing (S90), the vehicle 2 performs a final authentication (authentication of the user information or the like) inside the car), and thereafter, autonomously performs the traveling of the vehicle 2 as autonomous driving processing (S92). When the autonomous driving processing (S92) ends, the flowchart illustrated in FIG. 13 ends. As above, the pick-up processing ends.

The order of executing the trunk unlocking processing (S84) and the door lock unlocking processing (S86) in FIG. 13 may be reversed. The trunk locking processing (S88) can be executed at any time as long as after the trunk unlocking processing (S84) and before the autonomous driving processing (S92).

Summary of Fourth Embodiment

By separating the boarding security key and the luggage security key, the server 30 can realize a safe luggage pick-up while securing the boarding security.

Fifth Embodiment

A vehicle dispatch system in a fifth embodiment is different from the vehicle dispatch system 1 in the first embodiment in a point that a case where another user is sharing the vehicle 2 during the delivery service is disclosed, and others are the same as that in the first embodiment. In the fifth embodiment, the descriptions same as that in the first embodiment will not be repeated.

Figure 14:
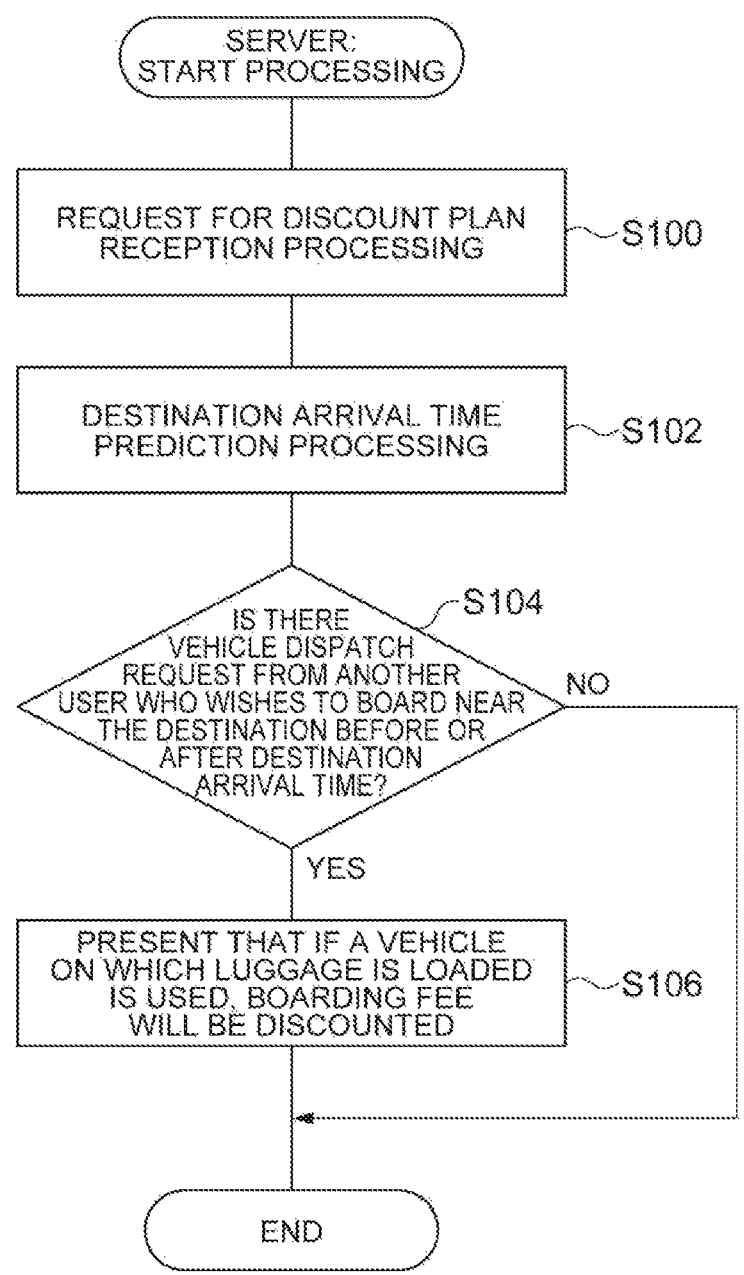
FIG. 14 is a flowchart illustrating an example of vehicle sharing processing performed by the server.

FIG. 14 is a flowchart illustrating an example of vehicle sharing processing performed by the server. The flowchart in FIG. 14 is executed by the server 30. The flowchart in FIG. 14 is executed, for example, at the timing when the user device 10 agrees to the discount plan.

As illustrated in FIG. 14, as reception processing (S100), the server 30 receives a request for discount plan from the user device 10.

Subsequently, as prediction processing (S102), the server 30 predicts a time to arrive at the destination (a destination arrival time) based on the boarding position, the destination, the traffic condition, the weather, and the like. Subsequently, as determination processing (S104), the server 30 determines whether or not there is a vehicle dispatch request from another user who wishes to board near the destination before or after the destination arrival time.

When it is determined that there is a vehicle dispatch request (YES in S104), as fee presentation processing (S106), the server 30 presents a fact that there is a vehicle on which the luggage is loaded, and when that vehicle is used, the boarding fee will be discounted (the lower boarding fee) to the user. The server 30 may notify the user of the fact that the luggage is loaded in the trunk, and thus, the space in the trunk is small. When the fee presentation processing (S106) ends, the flowchart illustrated in FIG. 14 ends. As above, the vehicle sharing processing ends.

Summary of Fifth Embodiment

In the server 30, another user can board the vehicle 2 on which the luggage is loaded and heading to the delivery place. Therefore, efficiency of vehicle dispatch can be improved.

The embodiments described above can be implemented in various forms in which various modifications and improvements are made based on knowledge of those skilled in the art.

The vehicle dispatch system 1 does not need to include a plurality of user devices and a plurality of vehicles, and may include only one user device and one vehicle.

In the examples, the vehicle 2 and the user device 10 are connected to the server 30 via the same network N, but may be connected to the server 30 via networks different from each other.

The vehicle dispatch system 1 may be a system in which a plurality of systems are integrated. For example, the vehicle dispatch system 1 may be a system in which a first system that includes a plurality of user devices 10A, . . . , 10X and the server 30, and a second system that includes a vehicle dispatch server and a plurality of vehicles 2A, 2B, . . . , 2X, are integrated, or may be a system in which a system configured with a plurality of user devices 10A, . . . , 10X, a system configured with the server 30, and a system configured with a plurality of vehicles 2A, 2B, . . . , 2X, are integrated.

A vehicle that does not have an autonomous driving function may be registered in the vehicle dispatch system 1.

When the second delivery service fee and the third delivery service fee are made free, the calculation unit 35 may not be included in the vehicle dispatch system 1. The vehicle dispatch system 1 calculates the second delivery service fee and the third delivery service fee based on the first delivery service fee. However, when the second delivery service fee and the third delivery service fee are made free, the second delivery service fee and the third delivery service fee are necessarily made lower than the first delivery service fee. That is, the vehicle dispatch system 1 may present a free fee plan as a delivery fee discount plan to the users who use the transportation service of which the boarding distance is a long distance or to the users who use the delivery service of which the delivery distance is a short distance. In this case, it is unnecessary for the calculation unit 35 to perform the calculation.

In the flowchart in FIG. 9, the distance determination processing (S34) and the second delivery service fee calculation processing (S36) may not be performed. In this case, when it is determined that the destination and the delivery place do not match (NO in S32), the process may proceed to the delivery determination processing (S40). In such a configuration, when the delivery distance is equal to or shorter than the reference delivery distance, the delivery service fee is calculated low. Therefore, it is easy for the user to use not only the transportation service by the autonomous driving vehicle but also the delivery service by the autonomous driving vehicle. Accordingly, the vehicle dispatch device can promote the use of the combined service which is the combination of the transportation and the delivery.

What is claimed is:

1. A vehicle dispatch system comprising:
a plurality of autonomous driving vehicles; and
a vehicle dispatch device configured to select an autonomous driving vehicle from among the autonomous driving vehicles in response to a vehicle dispatch request of a user, wherein the vehicle dispatch device comprises:
a map database (DB) configured to store map information; and
a processor programmed to:
acquire a boarding position, a destination, and a luggage delivery place based on the vehicle dispatch request;
determine whether the destination and the luggage delivery place match each other based on the map information stored in the map DB;
calculate a delivery service fee to the luggage delivery place;
determine whether a boarding distance from the boarding position to the destination is equal to or longer than a reference boarding distance;
determine whether a delivery distance from the destination to the luggage delivery place is equal to or shorter than a reference delivery distance,
wherein, when it is determined that: (i) the destination and the luggage delivery place do not match each other, and (ii) the boarding distance is not equal to or longer than the reference boarding distance, and (iii) the delivery distance is not equal to or shorter than the reference delivery distance, the processor is further programmed to calculate a first delivery service fee as the delivery service fee,
wherein, when it is determined that (i) the destination and the luggage delivery place do not match each other, and (ii) the boarding distance is equal to or longer than the reference boarding distance, the processor is further programmed to calculate a second delivery service fee, which is lower than the first delivery service fee, as the delivery service fee, and
wherein, when it is determined that (i) the destination and the luggage delivery place do not match each other, and (ii) the boarding distance is not equal to or longer than the reference boarding distance, and (iii) the delivery distance is equal to or shorter than the reference delivery distance, the processor is further programmed to calculate a third delivery service fee, which is lower than the first delivery service fee, as the delivery service fee;
provide the delivery service fee to the user before selecting the autonomous driving vehicle from among the autonomous driving vehicles; and
cause the selected autonomous driving vehicle to move to the boarding position after receiving a confirmation of the user,
wherein the selected autonomous driving vehicle is configured to:
move to the destination with the user and the luggage and then deliver the luggage to the luggage delivery place after the user alights from the selected autonomous driving vehicle at the destination.

2. The vehicle dispatch system according to claim 1, wherein the processor is further programmed to calculate the second delivery service fee by increasing the discount amount as the distance from the boarding position to the destination increases.

3. A vehicle dispatch system comprising:
a plurality of autonomous driving vehicles; and
a vehicle dispatch device configured to select an autonomous driving vehicle from among the autonomous driving vehicles in response to a vehicle dispatch request of a user, wherein the vehicle dispatch device comprises:
a map database (DB) configured to store map information; and
a processor programmed to:
acquire a boarding position, a destination, and a luggage delivery place based on the vehicle dispatch request;
determine whether the destination and the luggage delivery place match each other based on the map information stored in the map DB;
calculate a delivery service fee to the luggage delivery place; and determine whether a delivery distance from the destination to the luggage delivery place is equal to or shorter than a reference delivery distance, wherein, when it is determined that (i) the destination and the luggage delivery place do not match each other, and (ii) the delivery distance is not equal to or shorter than the reference delivery distance, the processor is further programmed to calculate a first delivery service fee as the delivery service fee, and wherein, when it is determined that (i) the destination and the luggage delivery place do not match each other and (ii) the delivery distance is equal to or shorter than the reference delivery distance, the processor is further programmed to calculate a third delivery service fee, which is lower than the first delivery service fee, as the delivery service fee;

provide the delivery service fee to the user before selecting the autonomous driving vehicle from among the autonomous driving vehicles; and cause the selected autonomous driving vehicle to move to the boarding position based upon receiving a confirmation from the user, wherein the selected autonomous driving vehicle is configured to:
move to the destination with the user and the luggage, and then deliver the luggage to the luggage delivery place after the user alights from the selected autonomous driving vehicle at the destination.

\* \* \* \* \*